US012244089B2

(12) United States Patent
Kropiewnicki et al.

(10) Patent No.: US 12,244,089 B2
(45) Date of Patent: Mar. 4, 2025

(54) MODULAR HIGH-CURRENT CONNECTOR SYSTEM

(71) Applicant: HARTING Electric Stiftung & Co. KG, Espelkamp (DE)

(72) Inventors: Norbert Kropiewnicki, Bielefeld (DE); Nicole Spilker, Lübbecke (DE); Sergej Zier, Loehne (DE); Thomas Beischer, Espelkamp (DE); Nando Hoppe, Nienstaedt (DE); Benjamin Krüger, Espelkamp (DE)

(73) Assignee: HARTING Electric Stiftung & Co. KG, Espelkamp (DE)

(*) Notice: Subject to any disclaimer, the term of this patent is extended or adjusted under 35 U.S.C. 154(b) by 312 days.

(21) Appl. No.: 17/798,478

(22) PCT Filed: Mar. 8, 2021

(86) PCT No.: PCT/DE2021/100234
§ 371 (c)(1),
(2) Date: Aug. 9, 2022

(87) PCT Pub. No.: WO2021/185407
PCT Pub. Date: Sep. 23, 2021

(65) Prior Publication Data

US 2023/0076774 A1 Mar. 9, 2023

(30) Foreign Application Priority Data

Mar. 18, 2020 (DE) ..................... 10 2020 107 396.8

(51) Int. Cl.
*H01R 13/422* (2006.01)

(52) U.S. Cl.
CPC ................................. *H01R 13/422* (2013.01)

(58) Field of Classification Search
CPC .................................................... H01R 13/422
See application file for complete search history.

(56) References Cited

U.S. PATENT DOCUMENTS

| | | | | |
|---|---|---|---|---|
| 4,202,591 A * | 5/1980 | Borgstrom | H01R 13/53 | 439/185 |
| 7,081,027 B2 * | 7/2006 | Woodward | H01R 9/24 | 439/777 |
| 7,906,729 B2 * | 3/2011 | Robertson | H02G 15/06 | 174/152 G |
| 7,972,155 B1 * | 7/2011 | Siebens | H01R 13/53 | 439/181 |

(Continued)

FOREIGN PATENT DOCUMENTS

| | | |
|---|---|---|
| CN | 1144979 A | 3/1997 |
| CN | 110707456 A | 1/2020 |

(Continued)

OTHER PUBLICATIONS

Nando HOPPE et al., co-pending U.S. Appl. No. 17/798,402, filed Aug. 9, 2022, national phase entry of PCT/DE2021/100233.

*Primary Examiner* — Vanessa Girardi
(74) *Attorney, Agent, or Firm* — Smartpat PLC

(57) ABSTRACT

A modular high-current connector (1) has a first housing part (7) and a second housing part (8) connected thereto. The second housing part (8) has an open housing wall (10). The open housing wall (10) can be added to by an unlimited number of additional housing parts.

4 Claims, 5 Drawing Sheets

(56) References Cited

U.S. PATENT DOCUMENTS

| | | | | |
|---|---|---|---|---|
| 9,124,050 | B2 * | 9/2015 | Siebens | H01R 13/207 |
| 9,379,468 | B2 | 6/2016 | Zieman et al. | |
| 2012/0244755 | A1 | 9/2012 | Suzuki et al. | |
| 2013/0323954 | A1 | 12/2013 | Eckel et al. | |
| 2018/0299239 | A1 | 10/2018 | Eitschberger et al. | |
| 2018/0309227 | A1 | 10/2018 | Diessel et al. | |
| 2021/0033375 | A1 | 2/2021 | Eitschberger et al. | |
| 2021/0143583 | A1 | 5/2021 | Zhang | |
| 2021/0210887 | A1 | 7/2021 | Kliever | |
| 2022/0037835 | A1 | 2/2022 | Kliever | |
| 2022/0393374 | A1 | 12/2022 | Kropiewnicki | |

FOREIGN PATENT DOCUMENTS

| | | | |
|---|---|---|---|
| DE | 1983593 | U | 4/1968 |
| DE | 102016115678 | A1 | 3/2018 |
| DE | 102018127720 | | 12/2019 |
| WO | 2019205115 | A1 | 10/2019 |
| WO | 2019219126 | A1 | 11/2019 |

* cited by examiner

MODULAR HIGH-CURRENT CONNECTOR SYSTEM

TECHNICAL FIELD

The disclosure relates to a modular high-current connector. Such high-current connectors are used for high-current applications and in particular for supplying power to transformers.

BACKGROUND

WO 2019/219126 A1 shows a connector for the use with high currents. For a higher transmission of power, two contact elements can be bridged with one another.

Connectors of this type in terms of the construction size are adapted to the respective field of application. Different construction sizes are typically also used for different fields of application.

The German Patent and Trademark Office has searched the following prior art in the priority application for the present application: DE 10 2018 127 720 B3 and WO 2019/219 126 A1.

SUMMARY

An object of the disclosure is to propose a high-current connector that can be adapted to the respective field of application in a modular manner.

This object is achieved by the subject matter of the independent claims.

Advantageous embodiments of the invention are specified in the dependent claims and the following description.

The high-current connector has a first housing part and a second housing part connected thereto. The connection of the two housing parts can be realized via a screw connection.

A pin contact is arranged in the first housing part. The first housing part forms the plug-in region or the plug-in side of the high-current connector. The contact pin therefore forms the contacting means for a socket, for example a transformer socket.

A connection contact element for electrical connection to an electrical line to be connected is arranged in the second housing part. The second housing part has an open housing wall. This open housing side can be closed via a housing cover. However, the housing wall at the same time forms the connection point for fixing a further housing part.

Preferably, it is possible to equip the modular high-current connector with a third housing part. The third housing part is fixed to the second housing part. A screw connection is preferably used for this purpose. Analogously to the second housing part, a further connection contact element is arranged in the third housing part for electrical connection to a further line to be connected.

It is possible to equip the modular high-current connector with further housing parts, i.e., a fourth, a fifth and/or a sixth housing part. In each of these housing parts, there is arranged a connection contact element for electrical connection to a further line to be connected. The housing parts are arranged one behind the other and fixed to each other. The third housing part is then fixed to the second housing part, the fourth housing part is fixed to the third housing part, and so on. The last housing part is closed via the above-mentioned housing cover, so that the high-current connector or its housing is closed and media-tight as a whole. This allows the high-current connector to be extended as required. The same components can be used for this purpose.

Worded differently, the third, fourth, fifth and sixth housing part may be identical parts stacked on top of each other. Also conceivable is the connection of a plurality of housing parts by common connection elements: two housing parts→medium-length screws, three housing parts→longer screws, etc.

Electrical lines are connected to the individual connection contact elements. Preferably, the various connection contact elements are electrically conductively connected to the pin contact. Higher currents can be transmitted via the pin contact over a plurality of lines connected in parallel. For example, with one line the high-current connector can transmit 400A, with two lines 800A, and with three lines correspondingly 1200A. The high-current connector can be extended as required and thus adapted to different fields of application.

In a particularly advantageous embodiment, the connection contact elements each have a connection region and a contact region. The electrical lines are connected to the connection region. This is achieved via a crimp connection. For this purpose, the connection region has a cylindrical opening. A crimp connection offers a high level of protection against vibration. This type of connection technology is therefore very popular, particularly in the rail sector. The contact region of the connection contact element has a cylindrical through-opening. For electrical contacting of the connection contact elements, the pin contact is inserted into the through-openings of the connection contact elements. The diameters of the pin contact and the individual through-openings are matched to each other for this purpose.

Preferably, the opening or the crimp opening and the through-opening of the corresponding connection contact element are oriented orthogonally to each other. As a result, the connection direction of the lines and the plug-in direction of the high-current connector also run orthogonally to each other. The lines run flat away from the connected device, which is particularly advantageous in the rail sector, as the lines run flat against a railcar wall and can thus be laid in a space-saving manner.

To ensure optimum electrical contact between the connection contact element and the pin contact, an encircling contact strip is preferably arranged inside the cylindrical through-opening of the connection contact element in question.

Preferably, the pin contact is substantially cylindrical and has a connection region and a contact region. The connection region forms the electrical contact described above between the pin contact and the connection contact elements. The contact region forms the electrical contact to a device socket or connection socket.

The contact region of the pin contact advantageously has an encircling thread. In addition, the contact region of the pin contact preferably has an encircling ring. The encircling thread runs as far as the encircling ring, as seen from the contact tip of the pin contact. This makes it possible to contact the pin contact with a so-called cable lug, which is pressed against the encircling ring by a nut screwed onto the thread. Such contacting has proven to be particularly durable and extremely resistant to vibration. This contacting technique is therefore particularly suitable for the rail sector.

Preferably, the pin contact has an axial opening in the contact region, which serves, for example, as a receptacle for a screwdriver or a wrench, in particular an Allen key. This allows the contact pin to be fixed in place when the lock nut for the cable lug is tightened. A polygonal outer contour can expediently also be implemented such that a wrench can be placed thereon. In this case, however, the external contour is to be implemented within an internal diameter of the thread.

BRIEF DESCRIPTION OF THE DRAWINGS

An exemplary embodiment of the invention is shown in the drawings and is explained in more detail below.

DETAILED DESCRIPTION

The figures contain partially simplified, schematic representations. Identical reference signs are sometimes used for like but possibly non-identical elements. Different views of like elements might be scaled differently.

Directional indications such as "left", "right", "top" and "bottom" are to be understood with reference to the figure in question and may vary in the individual representations with respect to the object depicted.

Figure 1A:
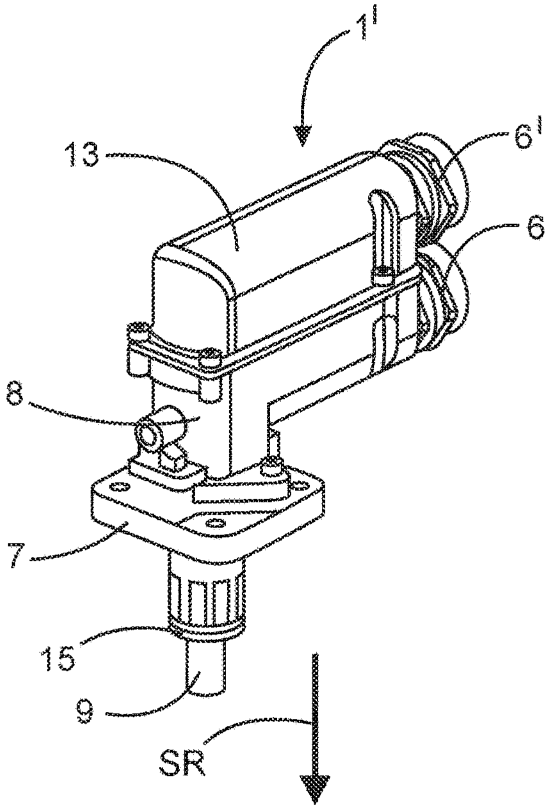
FIG. 1*a* shows a perspective view of a high-current connector for connecting one electrical line.
Figure 1B:
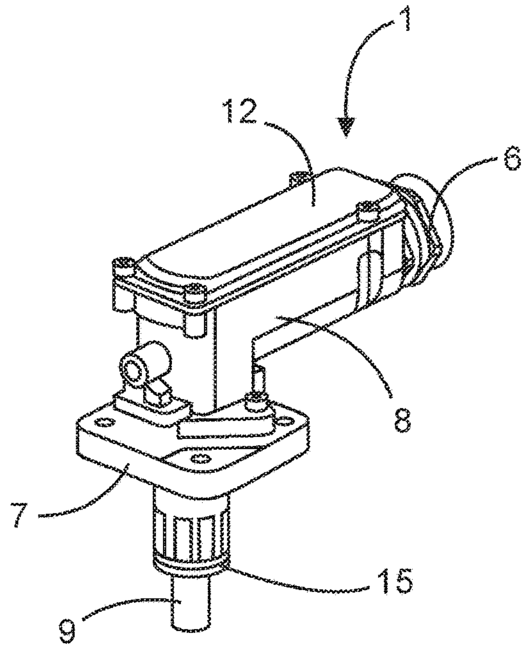
FIG. 1*b* shows a perspective view of a high-current connector for connecting two electrical lines.
Figure 2:
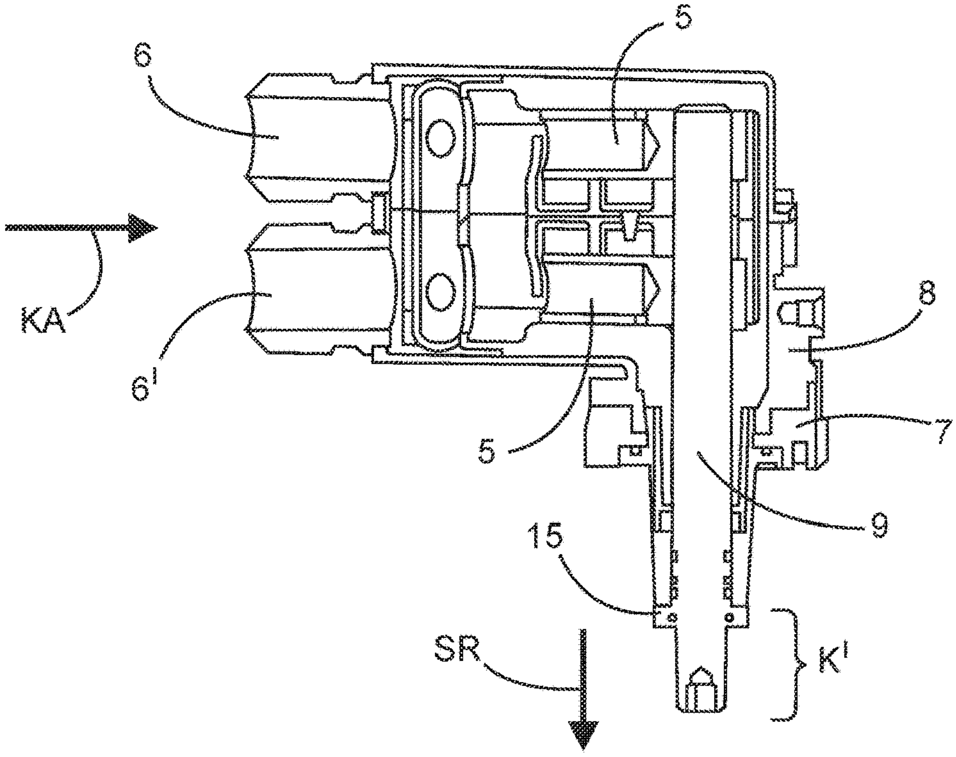
FIG. 2 shows a lateral sectional view of a high-current connector.

FIGS. 1*a* and 1*b* shows a perspective views of two high-current connectors 1, 1'. In the smaller version of the high-current connector 1 shown in FIG. 1*a*, one electrical line (not shown) is connected. In the larger version 1' shown in FIG. 1*b*, two electrical lines are connected. The larger version of the high-current connector 1' is thus capable of transmitting a higher amperage. FIG. 2 shows a sectional view of the larger high-current connector version 1'. The electrical lines connected to the high-current connector 1, 1' are fixed via a cable gland 6, 6'.

Figure 3:
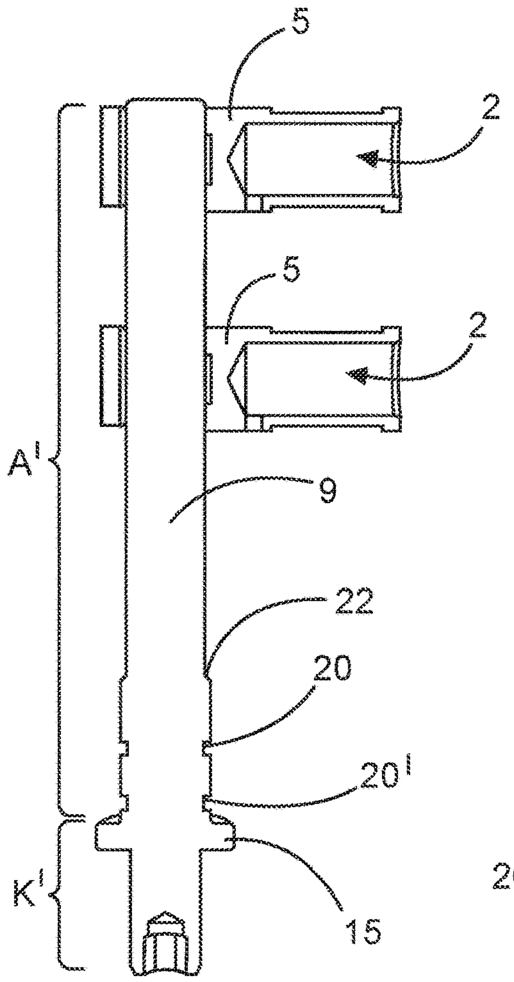
FIG. 3 shows a sectional view of a pin contact which is in electrical contact with two connection contact elements.
Figure 4:
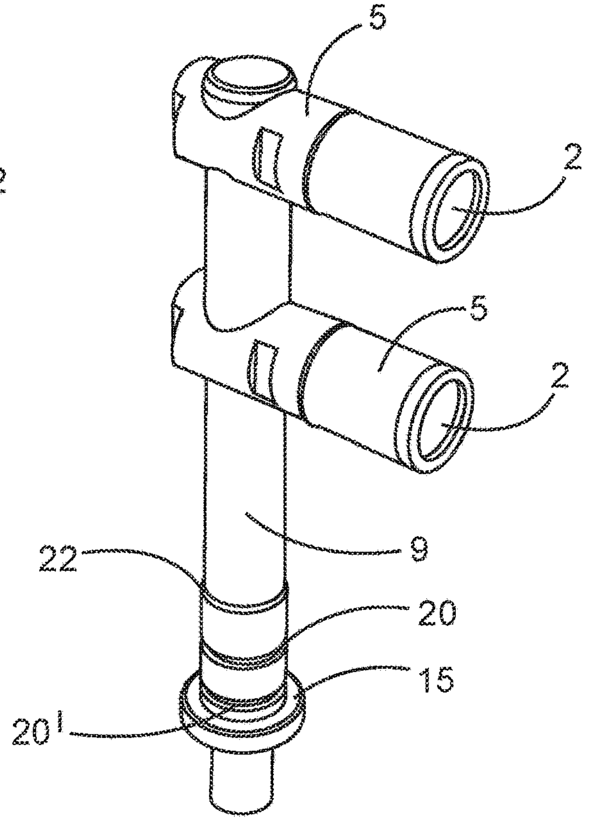
FIG. 4 shows a perspective view of a pin contact which is in electrical contact with two connection contact elements.

The high-current connector 1, 1' has a first housing part 7, in which there is arranged a pin contact 9. The pin contact 9 can be seen in detail in FIGS. 3 and 4. The pin contact 9 has a contact region K' and a connection region A'. The contact region K' of the pin contact 9 protrudes from the first housing part 7 on the plug-in side and forms the electrical contact with a device socket 27 (shown in FIG. 7) in the plugged state.

The pin contact 9 protrudes with its connection region A' into a second housing part 8 of the high-current connector 1, 1'. Here, the pin contact 9 is in electrically conductive contact with at least one connection contact element 5. An electrical line (not shown) is connected to each connection contact element 5 using crimping technology. The pin contact 9 and the connection contact element 5 or their main axes of symmetry are oriented orthogonally to each other. As a result, the plug-in direction and the cable connection direction of the high-current connector are also perpendicular to each other.

Figure 6:
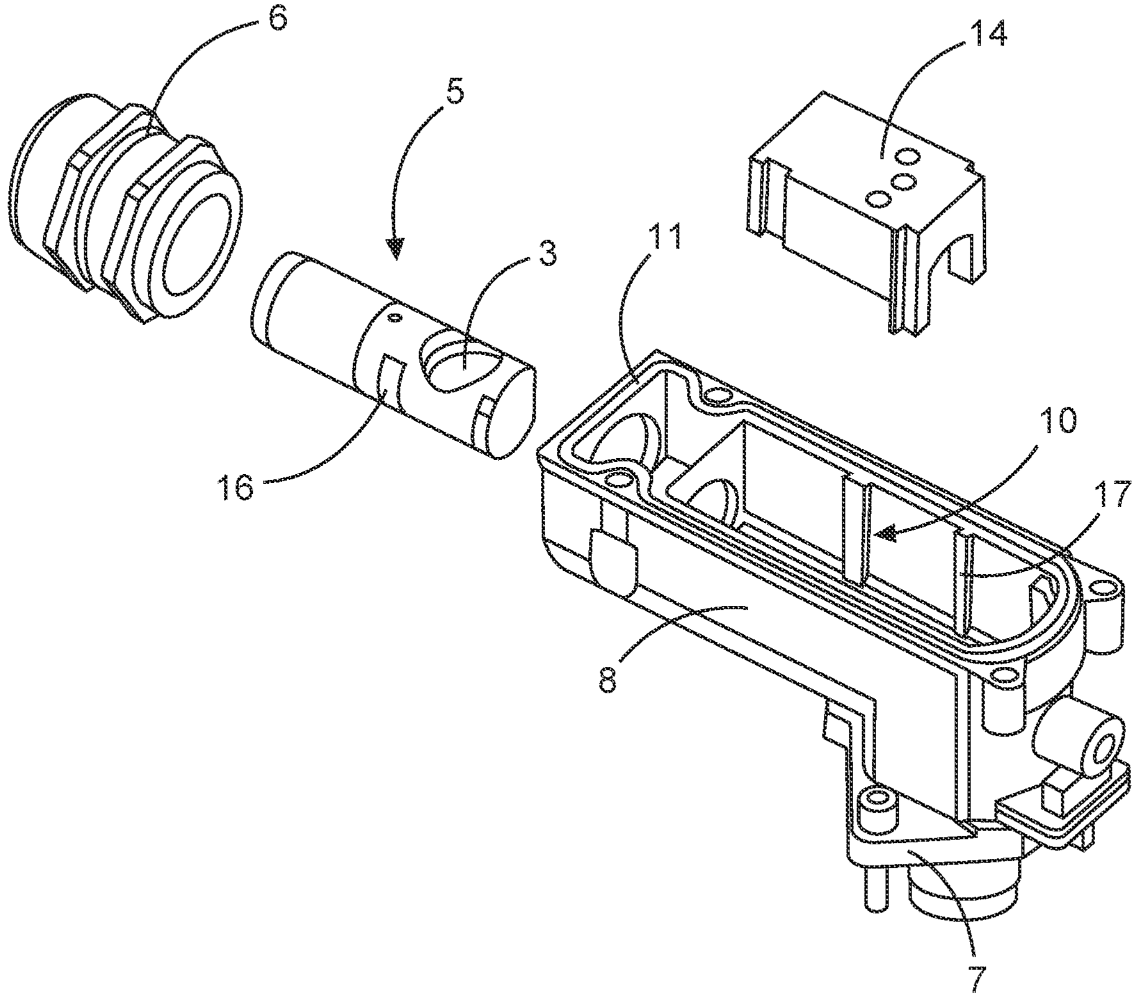
FIG. 6 shows an exploded view of a high-current connector.

In FIG. 6 it can be seen that the second housing part 8 has an open housing wall 10. The edge of the open housing wall 10 is provided with an encircling groove 11, in which a seal (not shown) is inserted for media sealing of the high-current connector 1, 1'. The open housing wall 10 can be closed via a housing cover 12. For modular expansion of the high-current connector 1', a further housing part, namely a third housing part 13, can be fitted on the open housing wall 10.

FIG. 2 shows that the third housing part 13 is also provided with a connection contact element 5, which can be provided on the connection side with a further connected line (not shown) and is electrically contacted on the contact side with the pin contact 9.

Figure 5:
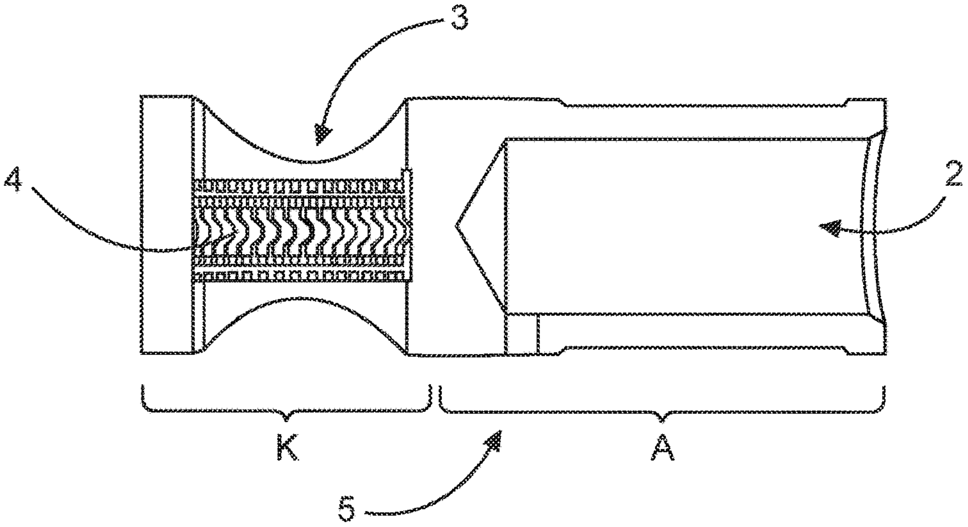
FIG. 5 shows a sectional view of a connection contact element.

FIG. 5 shows a sectional view of a connection contact element 5. The connection contact element has a groove 16 on both sides. In the second housing part 8, integrally molded ribs 17 engage in these grooves 16, thus ensuring that the connection contact element is prevented from rotating. The connection contact element 5 is fixed in the second housing part 8 via a fixing means 14. The same fixing element 14 can of course also be used for other housing parts, for example a third housing part 13.

The connection contact element 5 has a connection region A and a contact region K. The connection region A has a cylindrical opening 2, which is provided for a crimp connection to an electrical line to be connected. The contact region K of the connection contact element 5 has a cylindrical through-opening 3. For the electrical connection between the connection contact element 5 and the pin contact 9, the pin contact 9 is inserted into this through-opening 3. A contact strip 4 is arranged inside the through-opening 3 and ensures reliable electrical contact between the connection contact element 5 and the pin contact 9.

The main axes of symmetry of the crimp opening 2 and the through-opening 3 are oriented orthogonally to each other. As a result, the plug-in direction SR and cable connection direction KA of the high-current connector 1, 1' are oriented perpendicular to each other. The lines thus run flat away from the device, thereby allowing easy line routing or laying.

The contact region K' of the pin contact 9 is closed off by an encircling ring 15. Starting from the encircling ring 15 in the direction of its contact tip, the contact pin 9 has an encircling thread 20. When connecting the high-current connector 1, 1' to a transformer, for example, an annular cable lug (not shown) is guided around the contact tip of the contact pin 9. Via at least one threaded screw (not shown), the cable lug is fixed and thereby pressed against the ring surface of the encircling ring 15. Preferably, a second threaded screw or lock nut is used here to ensure optimum protection against vibration.

Figure 7:
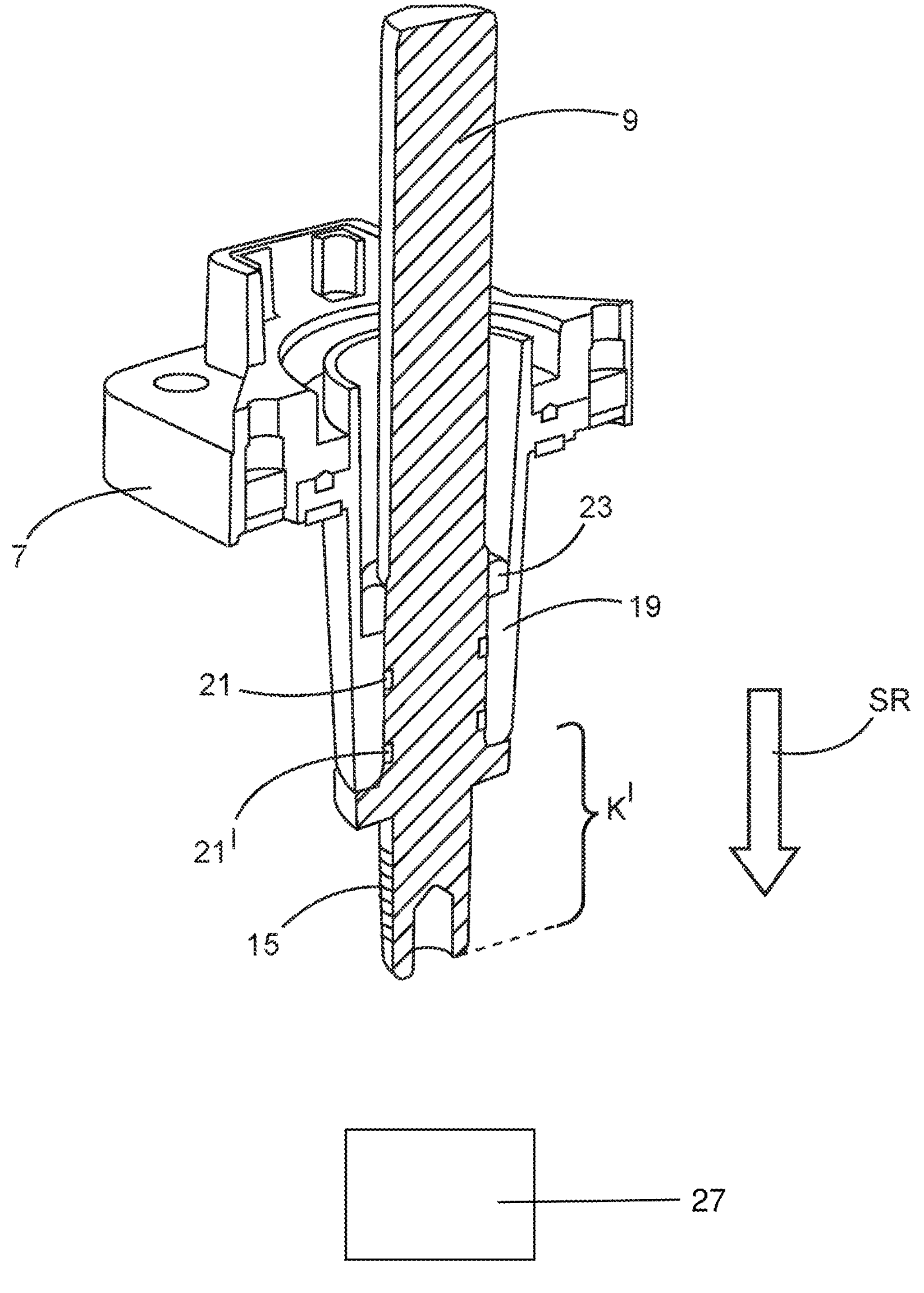
FIG. 7 shows a perspective sectional view of the first housing part of the high current connector, and FIG. 8 schematically illustrates a modular high-current with further housing parts.

FIG. 7 shows a perspective sectional view of the first housing part 7 of the high-current connector 1. The contact pin 9 is oriented in such a way that it protrudes with its contact region K' from the insulating body 19 in the plug-in direction SR. The insulating body 19 runs above the encircling ring—against the plug-in direction SR—to the first housing part 7 of the high-current connector 1. In this case, the insulating body 19 protrudes from the first housing part 7 and is held by the first housing part 7 only in its upper region. This freely running part of the insulating body 19 later protrudes into a device wall or into the transformer housing.

The contact pin 9 has two encircling grooves 20, 20' in the region that runs inside the insulating body 19. Ring seals 21, 21' are inserted one in each of these grooves 20, 20'. This provides the high-current connector 1 with a media-tight seal on the plug-in side.

The contact pin 9 protrudes-against the plug-in direction SR-out of the first housing part 7 into at least one second housing part 8 and possibly also into a third housing part 13. In this region, the above-mentioned connection contact elements 5 are connected to the pin contact 9.

The contact pin 9 has a shoulder 22 in the connection direction. Via this shoulder 22, the pin contact 9 can be fixed or clamped in the first housing part 7 with the aid of a fixing means 23.

The pin contact 9 is preferably made of pure copper to ensure a corresponding current-carrying capacity. The term 'pure copper' means that the material has a copper content of at least 99 percent by weight. The connection contact element or the connection contact elements can also consist of such pure copper.

Figure 8:
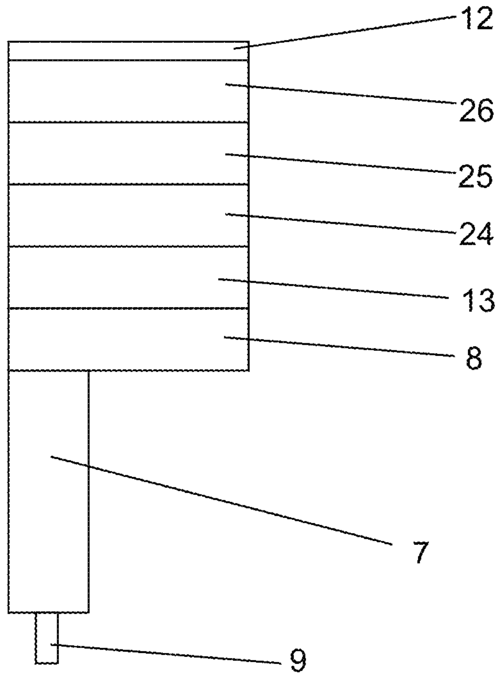

FIG. 8 schematically shows the modular high-current connector with further housing parts, namely a fourth housing part 24, a fifth housing part 25, and a sixth housing part 26. In each of these housing parts, there is arranged a connection contact element for electrical connection to a further line to be connected.

Even though various aspects or features of the invention are each shown in combination in the figures, it is apparent to a person skilled in the art—unless otherwise indicated—that the combinations shown and discussed are not the only possible ones. In particular, corresponding units or feature combinations from different exemplary embodiments may be interchanged with each other.

LIST OF REFERENCE SIGNS

1 high-current connector
2 opening
3 through-opening
4 contact strip
5 connection contact element
6 cable gland
7 first housing part
8 second housing part
9 pin contact
10 open housing wall
11 groove
12 housing cover
13 third housing part
14 fixing means
15 encircling ring
16 groove
17 rib
18 thread
19 insulating body
20 groove
21 ring seal
22 shoulder
23 fixing means
24 fourth housing part 24
25 fifth housing part
26 sixth housing part
27 device socket
A, A connection region K, K' contact region
KA cable connection direction
SR plug-in direction

The invention claimed is:

1. A modular high-current connector (1), comprising:
a first housing part (7);
a second housing part (8) connected to the first housing part (7);
a third housing part (13) arranged on top of the second housing part (8);
a pin contact (9) having a contact region (K') and a connection region (A'),
wherein the contact region (K') of the pin contact (9) protrudes from the first housing part (7) on a plug-in side thereof and is adapted to form an electrical contact for plugging into a device socket, and
wherein the connection region (A') of the pin contact (9) extends through the first housing part (7) through the second housing part (8) into the third housing part (13); and
a first connection contact element (5) arranged in the second housing part (8), the first connection contact element (5) having a connection region (A) for connecting an electrical line and a contact region (K) with a cylindrical through-opening (3) for receiving the pin contact (9),
a second connection contact element (5) arranged in the third housing part (13), the second connection contact element (5) having a further connection region (A) for connecting a further electrical line and a further contact region (K) with a further cylindrical through-opening (3) for receiving the pin contact (9),
wherein the second housing part (8) has an open housing wall (10), and
wherein the third housing part is fixed to the open housing wall (10), and
wherein the first connection contact element (5) includes grooves (16) into which ribs (17) of the second housing part (8) engage, whereby the first connection contact element (5) is prevented from rotating within the second housing part (8).

2. The modular high-current connector (1) as in claim 1, wherein the pin contact (9) comprises an encircling ring (15) within the contact region (K') of the pin contact (9) that protrudes from the first housing part (7).

3. The modular high-current connector (1) as in claim 1, wherein the connection region (A) of the first connection contact element (5) comprises a cylindrical opening (2) configured as a crimp connection to the electrical line, and
wherein the further connection region (A) of the second connection contact element (5) comprises a further cylindrical opening (2) configured as a further crimp connection to the further electrical line.

4. The modular high-current connector (1) as in claim 1, further comprising a fixing means (14) for fixing the first connection contact element (5) in the second housing part (8).

* * * * *